United States Patent [19]

Mauboussin

[11] 4,220,047
[45] Sep. 2, 1980

[54] FUEL TANK GAUGE

[75] Inventor: Joël Mauboussin, Bezons, France

[73] Assignees: Automobiles Peugeot; Societe Anonyme Automobiles Citroen, both of Paris, France

[21] Appl. No.: 3,643

[22] Filed: Jan. 15, 1979

[30] Foreign Application Priority Data

Feb. 22, 1978 [FR] France ................................. 78 05025

[51] Int. Cl.³ ...................... G01F 23/10; H01L 10/10
[52] U.S. Cl. ..................................... 73/313; 73/317; 338/33; 340/625
[58] Field of Search .......................... 73/313, 317, 318; 338/33; 340/625

[56] References Cited

U.S. PATENT DOCUMENTS

| 2,350,042 | 5/1944 | Jurs et al. | 73/318 |
| 3,240,388 | 3/1966 | Brainard | 338/33 X |
| 3,283,314 | 11/1966 | Stewart | 73/313 X |

Primary Examiner—Daniel M. Yasich
Attorney, Agent, or Firm—Burns, Doane, Swecker & Mathis

[57] ABSTRACT

The gauge comprises a float guided by a pivotal arm and associated with a sliding contact which cooperates with a rheostat. The rheostat is wound on a tube which is placed vertically in the tank. The sliding contact guided by this tube is connected to the float by a flexible thread-like element which extends around upper and lower pulleys. The lower pulley is directly connected by the flexible element to the point at which this element is connected to the float.

7 Claims, 3 Drawing Figures

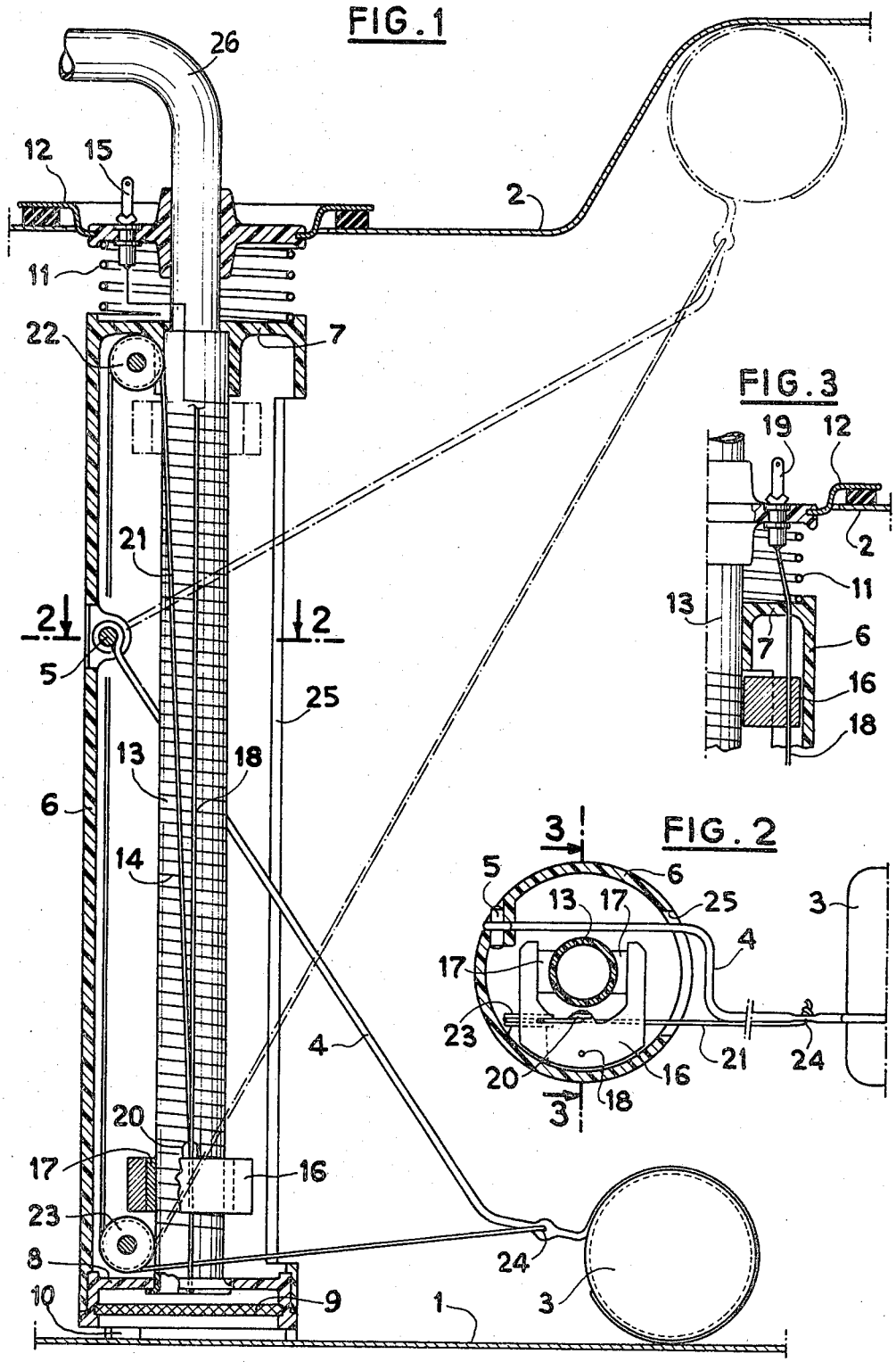

FUEL TANK GAUGE

DESCRIPTION

The present invention relates to a gauge for a tank containing a liquid and comprising a float which is associated with a measuring rheostat.

The invention more particularly, but not exclusively, applies to fuel tanks on a motor vehicle.

Gauges employed in fuel tanks are usually of two types: tubular gauges and gauges having a pivotal arm.

The tubular gauges comprise a float guided on a vertical tube on which there is wound a resistance wire forming a rheostat. The float acts also as a sliding contact on this rheostat. These gauges have the advantage of high sensitivity owing to the great length of the rheostat. However they have the drawback of leaving a relatively large unmeasured volume in both the lower part and upper part of the tank.

With the gauges having a pivotal arm, the unmeausred volume is smaller but the sensitivity is considerably reduced owing to the small size of the rheostat.

An object of the invention is to provide a gauge which combines the advantages of the two foregoing arrangements and in particular has high sensitivity and leaves a small unmeasured volume of liquid.

According to the invention, there is provided a gauge comprising a float carried by a pivotal arm and associated with a sliding contact which cooperates with a rheostat, wherein the rheostat is wound on a tube placed vertically in the tank, a sliding contact which is guided by this tube being connected to the float by a flexible thread-like element which passes around pulleys so that the displacement of the float between the lower and upper walls of the tank results in a displacement of the sliding contact in the same direction between the lower and upper parts of the guide tube.

An embodiment of the invention is described in the ensuing description with reference to the accompanying drawing in which:

FIG. 1 is an assembly view of the gauge in elevation and partly in section;

FIG. 2 is a sectional view taken on line 2—2 of FIG. 1, and

FIG. 3 is a sectional view taken on line 3—3 of FIG. 2 of the upper part of the gauge.

The illustrated gauge is disposed in a tank whose lower wall 1 and upper wall 2 are partly shown.

The gauge comprises a float 3 carried by an arm 4 which is pivotally mounted on a pin 5 fixed in a tube 6 which extends vertically between the walls 1 and 2. This tube is closed in its upper part by a wall 7 and in its lower part by an annular element or plug 8 in which a filter 9 is disposed.

The plug 8 bears against the lower wall 1 of the tank through bosses 10 between which the liquid can flow. The tube 6 is maintained against the lower wall 1 by a spring 11 disposed between the upper part of the tube and an annular element or plug 12 fixed to the upper wall 2 of the tank.

A smaller second tube 13 connects the wall 7 to the plug 8.

Wound around the tube 13 is an electric wire 14 which forms a rheostat. This wire is connected to an insulated terminal 15 carried by the plug 12. Slidable on the rheostat 14 is a sliding contact 16 which is guided on the tube 13 by two jaws 17 and on a wire 18 which is held taut between the plug 8 and the wall 7. This wire 18 constitutes the earth wire of the rheostat and is connected to a terminal 19 carried by the plug 12 (FIG. 3).

Fixed on the sliding contact 16 is a hook 20 to which there is hooked one end of a flexible thread or wire 21 which extends in succession around pulleys 22 and 23 and is hooked by its other end to the arm 4 at a point 24 close to the float 3.

The pulley 22 is located in the upper part of the tube 6 and the pulley 23 is located in the lower part. The pulleys 22 and 23 are contained in a vertical plane in which is also contained the hook 20 and the point at which the wire 21 is hooked to the arm 4.

The pin 5 is relatively remote from the pulley 23 connected by the wire or thread 21 to the hooking point 24 on the arm 4 so that, for a vertical displacement of the float 3 in the upper part of its travel, there corresponds a displacement of the sliding contact 16 on the rheostat 14 which is smaller than that corresponding to a vertical displacement of the same value of the float 3 in the lower part of its travel.

The arm 4 and the wire or thread 21 move in a vertical slot 25 formed in the wall of the tube 6.

A tube 26 for drawing the liquid out of the tank extends through the plug 12 and enters the tube 13 and reaches the lower part of the latter. This tube 26 also acts as a guide for the whole of the device.

The device just described operates in the following manner:

When the tank is practically empty, the float 3 rests on the lower wall 1 of the tank (position shown in full lines in FIG. 1) and the sliding contact 16 is located at the bottom of the rheostat 14.

When the tank is full, the float 3 bears against the upper wall 2 and the sliding contact 16 is located in the upper part of the rheostat 14 (position shown in dot-dash lines in FIG. 1). During the upward motion of the float 3, the sliding contact 16 is pulled upwards through the wire 21 which extends around the pulleys 23 and 22.

It can be seen that the device described satisfies the requirements:

the rheostat 14 is of great length, which imparts high sensitivity to the gauge;

the float 3 is movable between the walls 1 and 2 and the unmeasured volume is very small, even if for reasons of construction, the plug 12 is not placed in the highest part of the wall 2 as shown in FIG. 1;

the kinematic arrangement of the device is such that, for a given difference of level of the liquid in the tank, the displacement of the sliding contact 16 is greater in the lower zone than in the upper zone so that there is a higher sensitivity in the neighbourhood of the lower levels of the liquid in the tank.

Having now described my invention what I claim as new and desire to secure by Letters Patent is:

1. A gauge, in particular for a liquid tank, such as a fuel tank, comprising a pivotal float, a pivotable arm pivotally connected to a member mounted within said tank and carrying the float, a rheostat wound on a first tube which is placed substantially vertically in the tank, a sliding contact cooperative with the rheostat and guided by said first tube, upper and lower pulleys, a flexible threadlike element which extends around upper and lower pulleys, and drivingly connects the sliding contact to the float at a given point of said arm adjacent the float.

2. A gauge as claimed in claim 1, wherein said member mounted within said tank is a second substantially vertical tube, said gauge further comprising a pivot pin for the pivotal arm and fixed to the second tube in a position between lower and upper walls of the tank, the second tube surrounding the rheostat, a wall closing an upper part of the second tube and a plug closing a lower part of the second tube and a filter disposed in the plug.

3. A gauge as claimed in claim 2, wherein the plug bears against the lower wall of the tank by bosses between which bosses the liquid can flow.

4. A gauge as claimed in claim 2 or 3, wherein the pivotal arm and the flexible element are movable in a vertical slot formed in the wall of the second tube.

5. A gauge as claimed in claim 2 or 3, comprising a wire held taut between the plug and said wall of the second tube, said wire constituting an earth wire of the rheostat and guiding the sliding contact.

6. A gauge as claimed in claim 2 or 3, comprising a second plug fixed to an upper wall of the tank and a spring connecting the second plug to the gauge.

7. A gauge as claimed in claim 2 or 3, guided by pipe which extends throughout the height of the first tube, said pipe extending through the plug and capable of acting as a pipe for drawing liquid out of the tank.

* * * * *